(12) United States Patent
Wu

(10) Patent No.: US 11,679,632 B2
(45) Date of Patent: *Jun. 20, 2023

(54) TIRE PRESSURE SENSOR IDENTIFICATION METHOD AND RELATED APPARATUS AND SYSTEM

(71) Applicants: AUTEL HECHUANG SOFTWARE DEVELOPMENT CO. LTD., Guangdong (CN); AUTEL INTELLIGENT TECHNOLOGY CORP., LTD., Guangdong (CN)

(72) Inventor: Yong Wu, Guangdong (CN)

(73) Assignees: AUTEL HECHUANG SOFTWARE DEVELOPMENT CO., LTD., Guangdong (CN); AUTEL INTELLIGENT TECHNOLOGY CORP., LTD., Guangdong (CN)

( * ) Notice: Subject to any disclaimer, the term of this patent is extended or adjusted under 35 U.S.C. 154(b) by 427 days.

This patent is subject to a terminal disclaimer.

(21) Appl. No.: 16/888,087

(22) Filed: May 29, 2020

(65) Prior Publication Data

US 2020/0317007 A1 Oct. 8, 2020

Related U.S. Application Data

(63) Continuation-in-part of application No. 16/514,178, filed on Jul. 17, 2019, now Pat. No. 10,696,105, and (Continued)

(30) Foreign Application Priority Data

Jan. 17, 2017 (CN) .......................... 201710036080.X

(51) Int. Cl.
*B60C 23/04* (2006.01)
*B60K 35/00* (2006.01)

(52) U.S. Cl.
CPC ...... *B60C 23/0416* (2013.01); *B60C 23/0435* (2013.01); *B60K 35/00* (2013.01); *B60K 2370/152* (2019.05); *B60K 2370/167* (2019.05)

(58) Field of Classification Search
None
See application file for complete search history.

(56) References Cited

U.S. PATENT DOCUMENTS 7,369,043 B2 * 5/2008 McQuade ........... B60C 23/0471
340/447
7,880,595 B2 2/2011 Shimura
(Continued)

FOREIGN PATENT DOCUMENTS

CN 102555695 A 7/2012
CN 104129241 A 11/2014
(Continued)

OTHER PUBLICATIONS

International Search Report dated Apr. 2, 2018; PCT/CN2018/073102.
(Continued)

*Primary Examiner* — Octavia Davis Hollington
*Assistant Examiner* — Jermaine L Jenkins

(57) ABSTRACT

The present invention discloses a tire pressure sensor identification method, a related apparatus and system. A tire pressure sensor identification apparatus in the present invention includes a storage module configured to store identity information of a tire pressure sensor, a communications module configured to communicate with an electronic control unit (ECU) of a vehicle, a processing module and a radio frequency transmission module configured to output identity information. The tire pressure sensor identification apparatus may output the stored identity information to a corresponding vehicle, so that the vehicle can still identify the tire pressure sensor even if the tire pressure sensor is not in an (Continued)

activated state. It is convenient for a user to perform a uniform identification operation after uniformly collecting the identity information, thereby improving identification efficiency of the tire pressure sensor. A tire pressure sensor identification system and a corresponding tire pressure sensor identification method adopting the tire pressure sensor identification apparatus also have a same technical effect.

21 Claims, 6 Drawing Sheets

Related U.S. Application Data a continuation-in-part of application No. PCT/CN2018/073102, filed on Jan. 17, 2018.

(56) References Cited

U.S. PATENT DOCUMENTS

| | | | |
|---|---|---|---|
| 8,266,954 B2* | 9/2012 | Toyofuku | B60C 23/0457 |
| | | | 73/146 |
| 8,299,908 B2* | 10/2012 | Isomura | B60C 23/0408 |
| | | | 73/146 |
| 9,296,266 B1 | 3/2016 | Chen | |
| 10,696,105 B2* | 6/2020 | Wu | B60C 23/0479 |
| 2008/0164846 A1 | 7/2008 | DeKeuster et al. | |

FOREIGN PATENT DOCUMENTS

| | | | |
|---|---|---|---|
| CN | 204726163 U | 10/2015 |
| CN | 105082900 A | 11/2015 |
| CN | 106240252 A | 12/2016 |
| CN | 106427418 A | 2/2017 |
| CN | 106827975 A | 6/2017 |
| KR | 20130029963 A | 3/2013 |

OTHER PUBLICATIONS

USPTO NFOA dated Sep. 27, 2019 in connection with U.S. Appl. No. 16/514,178.

International Search Report dated Feb. 7, 2021; PCT/CN2020/092159.

* cited by examiner

TIRE PRESSURE SENSOR IDENTIFICATION METHOD AND RELATED APPARATUS AND SYSTEM

RELATED APPARATUS AND SYSTEM

The present application claims is a continuation in part of U.S. application Ser. No. 16/514,178, filed on Jul. 17, 2019, which claims priority to PCT Application No. PCT/CN2018/073102 filed on Jan. 17, 2018, which claims priority to Chinese Patent Application No. 201710036080.X, filed with the Chinese Patent Office on Jan. 17, 2017, and entitled "TIRE PRESSURE SENSOR IDENTIFICATION METHOD AND RELATED APPARATUS AND SYSTEM", which is incorporated herein by reference in its entirety.

BACKGROUND

Technical Field

The present invention relates to the field of vehicle technologies, and in particular, to a tire pressure sensor identification method and a related apparatus and system.

Related Art

There are mainly two types of tire pressure monitoring systems (TPMSs): an indirect type and a direct type. An indirect-type TPMS obtains a rotation speed difference by comparing rotation speeds of tires by using wheel speed sensors of an anti-lock braking system (ABS) of a vehicle, to monitor tire pressure, and is of a post-passive type. A direct-type TPMS directly measures inflation pressure of tires by using a tire pressure sensor mounted inside each tire and is of a proactive prevention type. Because accuracy of determining a fault of the former is poorer than that of the latter, the direct-type TPMS is used in common.

The direct-type TPMS usually includes tire pressure sensors and an electronic control unit (ECU). During initiation, it is usually needed to enable the ECU of the direct-type TPMS to store identification codes of all of the tire pressure sensors, to ensure that the ECU can identify the tire pressure sensor in each tire. In addition, only when a tire pressure sensor is in an activated state, the ECU can identify a radio frequency signal sent by the tire pressure sensor, and further reads a corresponding identification code.

In an identification process for a tire pressure sensor, an active time of the tire pressure sensor is limited. Once an active time period of the tire pressure sensor ends (that is, to save energy, the tire pressure sensor performs a sleep mode which does not send a radio frequency signal), and the ECU fails to perform identification before the time period ends, the identification process for the tire pressure sensor needs to be restarted. Therefore, to avoid missing the active time period of the tire pressure sensor, in an existing implementation, an identification operation needs to be individually performed for each tire, so as to ensure that the ECU identifies each tire pressure sensor. After the entire identification process is completed, a user needs to reciprocate between a position of a tire and a cab many times and perform repeated operations. Especially for a vehicle with two or more wheels, efficiency of an identification operation of a tire pressure sensor adopting the foregoing identification method is low.

SUMMARY

To resolve the foregoing technical problem, the present invention provides a tire pressure sensor identification apparatus capable of storing identity information of a tire pressure sensor and outputting the identity information.

To resolve the foregoing technical problem, the present invention provides a tire pressure sensor identification apparatus, including a storage module, a communications module, a processing module, and a radio frequency transmission module, where the storage module, the communications module and the radio frequency transmission module are respectively communicably connected to the processing module;

the storage module is configured to store identity information of a tire pressure sensor;

the communications module is configured to communicate with an ECU of a vehicle and to receive response information fed back by the ECU; and the processing module is configured to parse the response information received by the communications module to determine whether the ECU enables a sensor learning mode, and if yes, control the radio frequency transmission module to send identity information of a tire pressure sensor corresponding to the vehicle.

Further, the storage module is further configured to store communication frequencies of tire pressure sensors of vehicles of different types.

The radio frequency transmission module is configured to send the identity information of the tire pressure sensor corresponding to the vehicle by simulating a communication frequency of the tire pressure sensor of the vehicle.

Still further, the tire pressure sensor identification apparatus further includes an obtaining module, communicably connected to the processing module and configured to obtain identity information of a tire pressure sensor, the identity information being stored in the storage module after being processed by the processing module.

Yet further, the obtaining module includes an activation module and a radio frequency receiving module, the activation module being configured to activate a tire pressure sensor by outputting a low frequency signal, and the radio frequency receiving module being configured to receive identity information sent by the activated tire pressure sensor.

As an improvement, the obtaining module includes an input module, configured to receive the identity information of the tire pressure sensor input by a user.

As an improvement, the tire pressure sensor identification apparatus further includes a display module, communicably connected to the processing module and configured to display the obtained identity information of the tire pressure sensor and a working status.

To resolve the foregoing problems, the present invention further provides a tire pressure sensor identification system, including a tire pressure sensor, an ECU and the tire pressure sensor identification apparatus according to any one of the foregoing, the tire pressure sensor identification apparatus being communicably connected to the ECU and the tire pressure sensor.

To resolve the foregoing problems, the present invention further provides a tire pressure sensor identification method, including the following steps:

receiving response information fed back by an ECU after communication connection to the ECU of a vehicle is established;

parsing the received response information to determine whether the ECU enables a sensor learning mode, and if yes, obtaining identity information of a tire pressure sensor corresponding to the vehicle from stored identity information of tire pressure sensors; and sending the identity information of the tire pressure sensor corresponding to the vehicle to the ECU.

Further, before the step of receiving response information fed back by an ECU after communication connection to the ECU of a vehicle is established, the method further includes the following steps:

activating a tire pressure sensor by outputting a low frequency signal; and receiving identity information sent by the activated tire pressure sensor and storing the identity information.

Still further, before the step of receiving response information fed back by an ECU after communication connection to the ECU of a vehicle is established, the method further includes the following step:

receiving identity information of a tire pressure sensor input by a user and storing the identity information.

Moreover, the tire pressure sensor identification method further includes the following step:

pre-storing communication frequencies of tire pressure sensors of vehicles of different types, where the step of sending the identity information of the tire pressure sensor corresponding to the vehicle to the ECU includes:

sending the identity information of the tire pressure sensor corresponding to the vehicle to the ECU by simulating a communication frequency of the tire pressure sensor of the vehicle.

Compared with the prior art, the present invention has the following beneficial effects: The storage unit is disposed inside the tire pressure sensor identification apparatus and stores the identity information of the tire pressure sensor after receiving the identity information. In addition, the tire pressure sensor identification apparatus is provided with the radio frequency transmitting unit, so that the apparatus can simulate a radio signal sent by a corresponding tire pressure sensor. In this way, it is convenient for the ECU to uniformly identify each tire pressure sensor on the vehicle, thereby preventing a user from reciprocating many times and from performing complex operations of inflating or deflating tires, simplifying an operation procedure in which the ECU identifies the tire pressure sensor, and improving identification operation efficiency and user experience.

Figure 1:
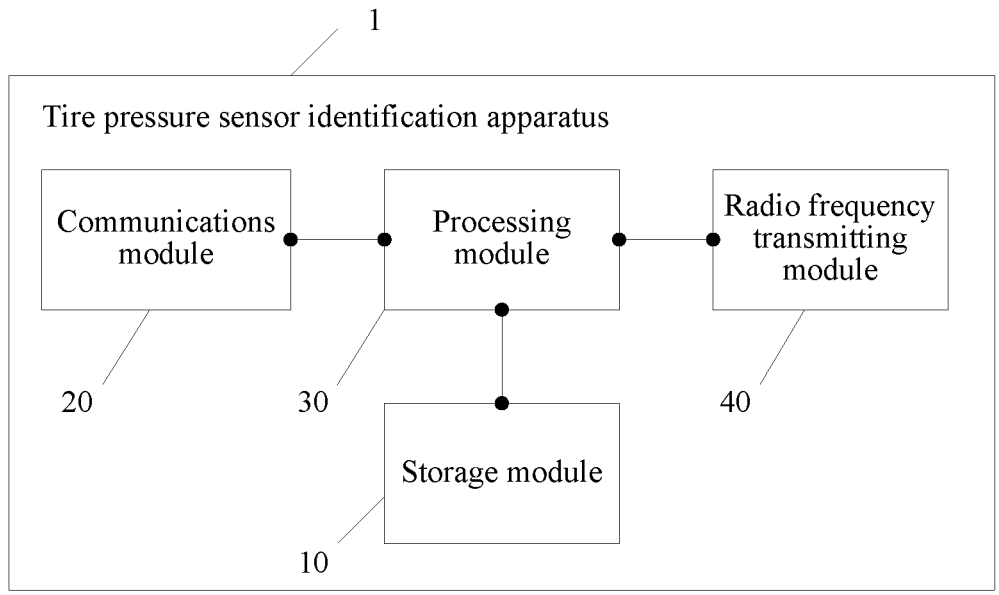
FIG. 1 is a schematic diagram of a basic functional framework of a tire pressure sensor identification apparatus according to the present invention.

Description of reference signs: 1: tire pressure sensor identification apparatus; 2: tire pressure sensor; 3: electronic control unit; 10: storage module; 20: communications module; 30: processing module; 40: radio frequency transmission module; 50: obtaining module; 51: activation module; 52: radio frequency receiving module; and 53: input module.

DETAILED DESCRIPTION

Typical implementations embodying features and advantages of the present invention will be described in detail in the following description. It should be understood that, the present invention can have various changes in different implementations, and the changes do not depart from the scope of the present invention. The description and drawings of the present invention are essentially used for describing, instead of limiting, the present invention.

First, the working principle of tire pressure monitoring and identification steps of a tire pressure sensor in the prior art are described in detail. Generally, a TPMS (a direct-type TPMS) usually learns a pressure value of each tire by using a tire pressure sensor disposed in each tire and receiving a radio signal (a radio frequency signal) sent back by the tire pressure sensor. Before monitoring tire pressure of tires of a vehicle, an ECU (usually, a single-chip microcomputer or a computer with a radio communication function) in the TPMS needs to record an identification code (identification ID) of a tire pressure sensor in each tire and a corresponding relationship between tires and tire pressure sensors. This recording process is a process in which the ECU identifies the tire pressure sensor. After identification is completed, the identification code and the corresponding relationship information are stored in the ECU. When receiving a radio signal including the identification code, the ECU also reads tire pressure information in the radio signal. That is, the ECU obtains the tire pressure information of the corresponding tire and intuitively displays the tire pressure information to a driver.

Usually, the tire pressure sensor is disposed in the tire. The tire pressure sensor cannot be connected to the ECU by using a cable and can communicate with the ECU only by using a radio signal (usually, a radio frequency signal). Because a built-in battery of the tire pressure sensor cannot be charged, the tire pressure sensor is usually in a sleep mode to save electric energy. The tire pressure sensor sends a radio signal (a radio frequency signal) carrying identity information (an identification code) and tire pressure information only when the tire pressure sensor is activated by a specific activation signal (a low frequency signal which consumes little electricity but has a short transmission distance), a tire leaks (tire pressure changes), or a tire moves. In addition, because integral design is usually adopted to reduce a size, after the battery of the tire pressure sensor runs out, the tire pressure sensor needs to be replaced entirely. The ECU needs to re-identify a new tire pressure sensor each time the tire pressure sensor is replaced.

The following further describes embodiments of the present disclosure in detail with reference to FIG. 1 to FIG. 6.

Referring to FIG. 1, an embodiment of the present disclosure provides a tire pressure sensor identification apparatus 1. As shown in FIG. 1, the tire pressure sensor identification apparatus 1 includes a storage module 10, a communications module 20, a processing module 30 and a radio frequency transmission module 40. The storage module 10, the communications module 20 and the radio frequency transmission module 40 are respectively communicably connected to the processing module 30.

The storage module 10 is configured to store identity information of a tire pressure sensor 2. The storage module 10 can be implemented by any kind of storage medium, such as a non-transitory storage. The storage module 10 can be controlled by the processing module 30.

The communications module 20 is configured to communicate with an ECU 3 of a vehicle and to receive response information fed back by the ECU 3. The communications module 20 can be implemented in a wired or a wireless way to communicate with the ECU 3. The ECU 3 may be disposed in a vehicle, combined with the tire pressure sensors to form a TPMS. The communications module 20 may connect with the interface of the vehicle to communicate with the ECU 3. The connection between the communications module 20 and the interface may be in a wired or wireless way.

The processing module 30 is configured to parse the response information received by the communications module 20 to determine whether the ECU 3 enables a sensor learning mode, and if yes, control the radio frequency transmission module 40 to send identity information of a tire pressure sensor 2 corresponding to the vehicle. The processing module is implemented by any kind of processor, such as a microprocessor or a central processing unit (CPU). The processing module 30 can receive a signal from the communications module 20, the processing module 30 may analyze the signal by running software or hardware to determine whether the ECU 3 enables a sensor learning mode. The processing module 20 can also send instructions to the communications module 20 to enable or disable the work status of the communications module 20. If the processing module 30 determines that the ECU is in a sensor learning mode, the processing module 20 fetches the stored information of tires, such as identity information, corresponding relationship between tires and tire pressure sensors, from the storage module 10, and sends the stored information to the radio frequency transmission module 40, the radio frequency transmission module 40 transforms the information to adapt for a transmission mode, and transmits the information to the ECU 3, such that the information originally sent by the tire pressure sensor may be simulated by the tire pressure sensor identification apparatus 1, no matter whether the actual tire pressure sensor is active or in sleep mode. In this case, the ECU 3 may learn tire information from the tire pressure sensor identification apparatus 1, the user operation during the identification process in the art may be simplified.

Specifically, the communications module 20 may be communicably connected to the ECU 3 of the vehicle in a wireless or a wired manner. After the connection, the communications module 20 may initiate a sensor learning request to the vehicle and receive response information fed back by the ECU 3 of the vehicle. The response information is used for indicating whether the vehicle has successfully enabled the sensor learning mode and may include, but not limited to, at least one of related information of the vehicle such as a model, a manufacturer, and a license plate number of the vehicle. After the ECU 3 enables the learning mode, the tire pressure sensor identification apparatus 1 sends corresponding identity information in the stored identity information to the ECU 3, uniformly by simulating a manner in which the tire pressure sensor 2 sends a radio signal when the tire pressure sensor is activated. In this way, when it is not convenient for an operator to activate the tire pressure sensor 2, or when the tire pressure sensor 2 is in an active time period while inconvenient for the ECU 3 to enable the learning mode, by means of signal simulation of the tire pressure sensor identification apparatus 1 in the present invention, no matter whether the tire pressure sensor 2 is activated, the ECU 3 can record the identity information of the tire pressure sensor 2, and thus an identification operation of the TPMS may be facilitated. In this embodiment, the processing module 30 is a control center of the tire pressure sensor identification apparatus 1. The processing module 30 may be a micro controller unit (MCU), configured to control various operations of the tire pressure sensor identification apparatus 1.

In this embodiment, the identity information of the tire pressure sensor 2 may be pre-written into the storage module 10 before the tire pressure sensor identification apparatus 1 being launched on the market, or may be automatically obtained by the tire pressure sensor identification apparatus 1 from other devices such as tire pressure sensor or from user input, and stored in the storage module 10. The obtaining manner of the identity information would not be limited in this embodiment of the present invention. The storage module 10 may store identity information of one or more tire pressure sensors 2 in one vehicle, or may store identity information of different kinds of tire pressure sensors of different vehicles.

In the embodiments of the present disclosure, it should be noted that the identity information of the tire pressure sensor 2 is used for uniquely identifying the tire pressure sensor 2. Different tire pressure sensors 2 have different identity information. The identity information mainly includes an identification code of the tire pressure sensor 2. For example, the identification code is a unique physical address of the tire pressure sensor 2, so as to distinguish the tire pressure sensor 2 from other tire pressure sensors located in different tires.

In the embodiments of the present disclosure, the identity information of the tire pressure sensor 2 includes, but not limited to, at least one of information such as the identification code, a model, a manufacturer, a service date, and battery capacity information, of the tire pressure sensor 2.

In the embodiments of the present disclosure, the communications module 20 may further be configured to implement external communication of the tire pressure sensor identification apparatus 1 such as information exchange with the ECU 3, or information exchange with an in-vehicle automatic diagnosis system of the vehicle. A communication manner of the communications module 20 may be a wired or a wireless connection manner for communication.

In the embodiments, the storage module 10 is further configured to store communication frequencies of tire pressure sensors 2 of different types of vehicles, so that the tire pressure sensor identification apparatus 1 is compatible with vehicles of different types. Specifically, the tire pressure sensor 2 adopts a communication frequency corresponding to a vehicle type, i.e., the tire pressure sensors in different vehicles may have different communication frequencies. The communication frequencies of the tire pressure sensors 2 of vehicles of different types are stored in the storage module 10. Also, the corresponding relationships of communication frequencies and vehicle types can be stored in the storage module 10. For example, a communication frequency of a tire pressure sensor 2 corresponding to a vehicle type 1 is f1, a communication frequency of the tire pressure sensor 2 corresponding to a vehicle type 2 is f2, and the like. Therefore, the tire pressure sensor identification apparatus 1 of the present invention is compatible with vehicles (tire pressure sensors) of a plurality of different types. Usually, the tire pressure sensors 2 in a same vehicle use a same communication frequency. The communication frequencies of the tire pressure sensors 2 on vehicles of a same type are the same, and the communication frequencies of the tire pressure sensors 2 on vehicles of different types are different. The communication frequency of the tire pressure sensor 2 is usually a radio frequency. A radio frequency signal has a strong anti-interference capability and a long propagation distance, by the radio frequency signal the tire pressure sensor 2 sends pressure information of a tire in real time to the ECU 3 in a vehicle cabin.

Specifically, the radio frequency transmission module 40 is configured to send the identity information of a tire pressure sensor 2 in the vehicle to the ECU 3 by simulating the communication frequency of the tire pressure sensor 2 of the vehicle.

In implementations, the processing module 30 sends a request to the vehicle to request vehicle information first, analyzes the response information fed back by the vehicle to obtain vehicle information such as a model of the vehicle, then obtains a communication frequency and identity information of a tire pressure sensor corresponding to the model of the vehicle from the storage module 10, and controls the radio frequency transmission module 40 to send identity information of the tire pressure sensor by simulating the communication frequency of the tire pressure sensor. The radio frequency transmission module 40 sends identity information by using the communication frequency and is configured to simulate the tire pressure sensor 2 when the ECU 3 identifies the tire pressure sensor 2, thereby facilitating identification by the ECU 3. By using the foregoing solution, the tire pressure sensor identification apparatus 1 in the present disclosure may replace tire pressure sensor 2 to send the identity information to the ECU 3 for identification when the tire pressure sensor 2 is not activated.

In some embodiments, the radio frequency transmission module 40 may send identity information of the tire pressure sensor 2 by trying different communication frequency at each time, until the ECU 3 receives the identity information through a specific communication frequency. In this case, the tire pressure sensor identification apparatus may not need to know communication frequency corresponding to the ECU 3.

In some embodiments, the radio frequency transmission module 40 may send the identity information of the tire pressure sensor 2 stored in the storage module 10 to the ECU 3 by using a communications cable, to complete identification of the tire pressure sensor 2 performed by the ECU 3.

In some embodiments, the tire pressure sensor identification apparatus 1 may transmit identity information from a tire pressure sensor to an ECU, wherein the tire pressure sensor and the ECU belong to a same TPMS. The tire pressure sensor identification apparatus 1 may obtain and store identity information of a tire pressure sensor at first, when detecting the ECU in the learning mode, it sends the stored identity information to the ECU, to complete the ECU learning process. Furthermore, in one way, before sending the stored identity information to the ECU, the tire pressure sensor identification apparatus 1 can obtain the mode of a vehicle in which the TPMS locates, and obtain a communication frequency corresponding to the vehicle mode, and send the identity information via the communication frequency; in another way, the tire pressure sensor identification apparatus 1 can obtain the communication frequency from the tire pressure sensor when obtaining the identity information. The tire pressure sensor identification apparatus 1 can active the tire pressure sensor by sending a low frequency signal to obtain identity information.

In some embodiments, different from the method mentioned above, the tire pressure sensor identification apparatus 1 may obtain the identity information by user input, in this case, the tire pressure sensor identification apparatus does not need to active the tire pressure sensor.

Optionally, the radio frequency transmission module 40 may transmit the identity information of only one tire pressure sensor 2 on the vehicle at one time. Specifically, only one tire pressure sensor 2 is identified in one learning process. If a plurality of tire pressure sensors 2 on the vehicle needs to be identified, the learning mode of the vehicle needs to be enabled the plurality of times. Alternatively, identity information of a plurality of or all tire pressure sensors 2 on the vehicle is transmitted at one time. Specifically, identification on the plurality of or all tire pressure sensors 2 on the vehicle can be completed in one learning process.

In the embodiments, the tire pressure sensor identification apparatus 1 further includes an obtaining module 50, communicably connected to the processing module 30 and configured to obtain identity information of a tire pressure sensor 2, the identity information being stored in the storage module 10 after being processed by the processing module 30. The obtaining module 50 may be configured in the radio frequency transmission module 40, to communicate with a tire pressure sensor to obtain identity information of the tire pressure sensor. In this case, the obtaining module 50 may be a radio frequency receiver, or other implementations that can receive information from a tire pressure sensor. In practice, the processing module 30 controls the radio frequency transmission module 40 to transmit a signal to a tire pressure sensor, so as to activate the tire pressure sensor to send its identity information by a radio frequency signal; the obtaining module 50 receives the identity information of the tire pressure sensor and transmits the identity information to the processing module 30, so that the processing module 30 stores the identity information to the storage module 10. This procedure may be implemented before the tire pressure sensor identification apparatus 1 communicates with the ECU, to enables the ECU to perform the learning mode, or this procedure may be implemented after the tire pressure sensor identification apparatus 1 detects the ECU in the learning mode. Alternatively, the obtaining module 50 may be configured independently from the radio frequency transmission module 40. The obtaining module 50 may include both a radio frequency transmitter and a radio frequency receiver, or a integrate apparatus having both transmitting and receiving functions, so as to communicate with a tire pressure sensor as an independent module. The processing module 30 may obtain identity information by controlling the obtaining module 50 directly.

Identity information sent by a to-be-identified tire pressure sensor 2 in the vehicle is uniformly obtained or collected, thereby avoiding a complex procedure in which an operation needs to be performed on the ECU 3 each time a tire pressure sensor 2 is identified. In addition, it is also convenient for the ECU 3 to identify all tire pressure sensors 2 at one time.

Figure 2:
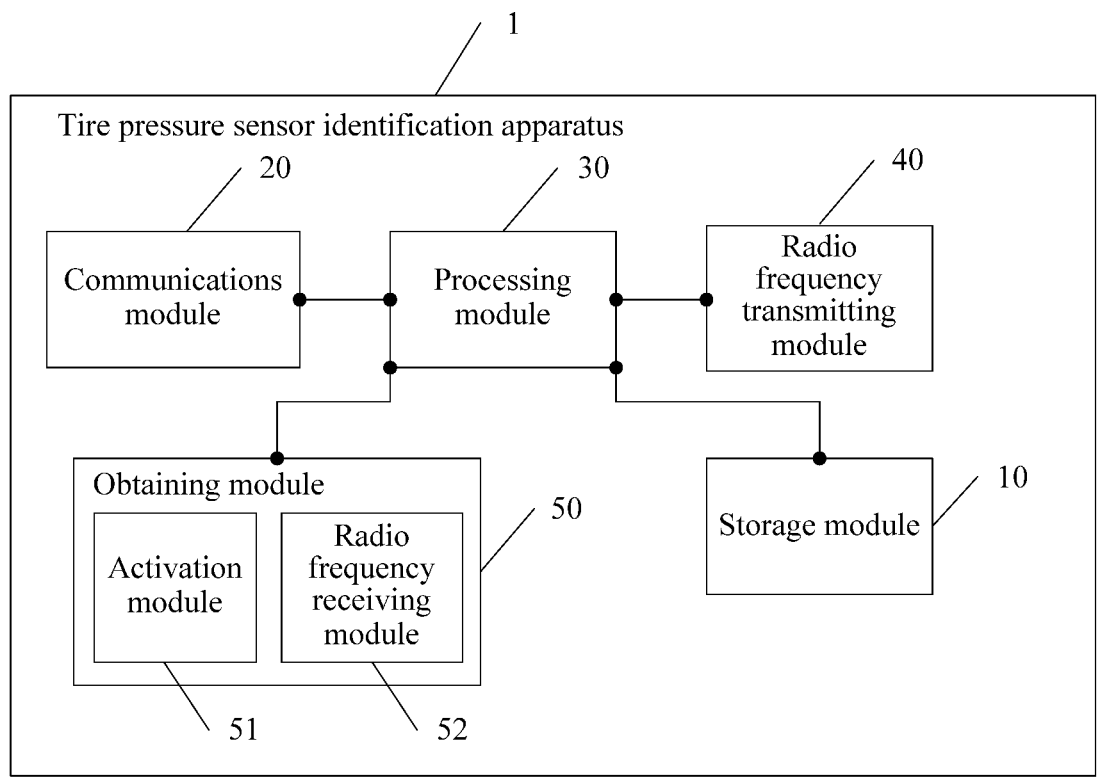
FIG. 2 is a schematic diagram of a functional framework of a first embodiment of a tire pressure sensor identification apparatus according to the present invention.

As shown in FIG. 2, in a first embodiment, the obtaining module 50 includes an activation module 51 and a radio frequency receiving module 52, the activation module 51 being configured to activate a tire pressure sensor 2 by outputting a low frequency signal, and the radio frequency receiving module 52 being configured to receive identity information sent by the activated tire pressure sensor 2.

The activation module 51 and the radio frequency receiving module 52 are respectively communicably connected to the processing module 30. Specifically, the processing module 30 controls the activation module 51 to activate the tire pressure sensor 2 by outputting the low frequency signal, so that the tire pressure sensor 2 sends out the identity information. In addition, the tire pressure sensor 2 further sends inflation pressure information (such as a pressure value and a temperature value of a tire) or the like information of the tire in which the tire pressure sensor 2 is located currently along with the identity information. Because a battery of the tire pressure sensor 2 cannot be replaced, when the inflation pressure of the tire is not changed or no activation signal is received, the tire pressure sensor 2 is in a sleep mode to reduce battery consumption. Therefore, when the tire pressure sensor 2 needs to be identified, an existing implementation of activating the tire pressure sensor 2 is changing the inflation pressure of the tire by inflation or deflation, so that the tire pressure sensor 2 turns into an activated state because of a change of the inflation pressure and sends out a radio signal (including the identity information, inflation pressure information of the tire, and the like), usually a radio frequency signal. However, operations of the activation manner of inflating or deflating a tire are complex. In the embodiments of the present disclosure, the activation module 51 configured to send a low frequency signal and disposed in the obtaining module 50 may be adoptable, so that the tire pressure sensor 2 in the sleep mode can be activated by the low frequency signal. Therefore, it is more convenient to activate the tire pressure sensor 2 and the complex operations of inflating or deflating a tire can be abandoned.

In addition, the radio frequency receiving module 52 adopts a radio frequency signal receiver to receive a radio frequency signal sent by the tire pressure sensor 2, while the tire pressure sensor 2 sends out the radio frequency signal when it receives the low frequency signal or when it is activated when the inflation pressure of the tire changes. The radio frequency receiving module 52 sends the received radio frequency signal to the processing module 30 for processing. Subsequently, the received radio frequency signal is sent to the storage module 10 for storage. In addition to the identity information of the tire pressure sensor 2, the radio frequency signal may further include the inflation pressure information measured by the tire pressure sensor 2 or the like. By using the foregoing manner, identity information of one or more to-be-identified tire pressure sensors 2 may be stored in the storage module 10, so that the radio frequency transmission module 40 simulates sending the identity information of the tire pressure sensors 2 when an ECU 3 of a vehicle enables a sensor learning mode, so that a learning function is performed by the vehicle to identify the tire pressure sensor 2.

Figure 3:
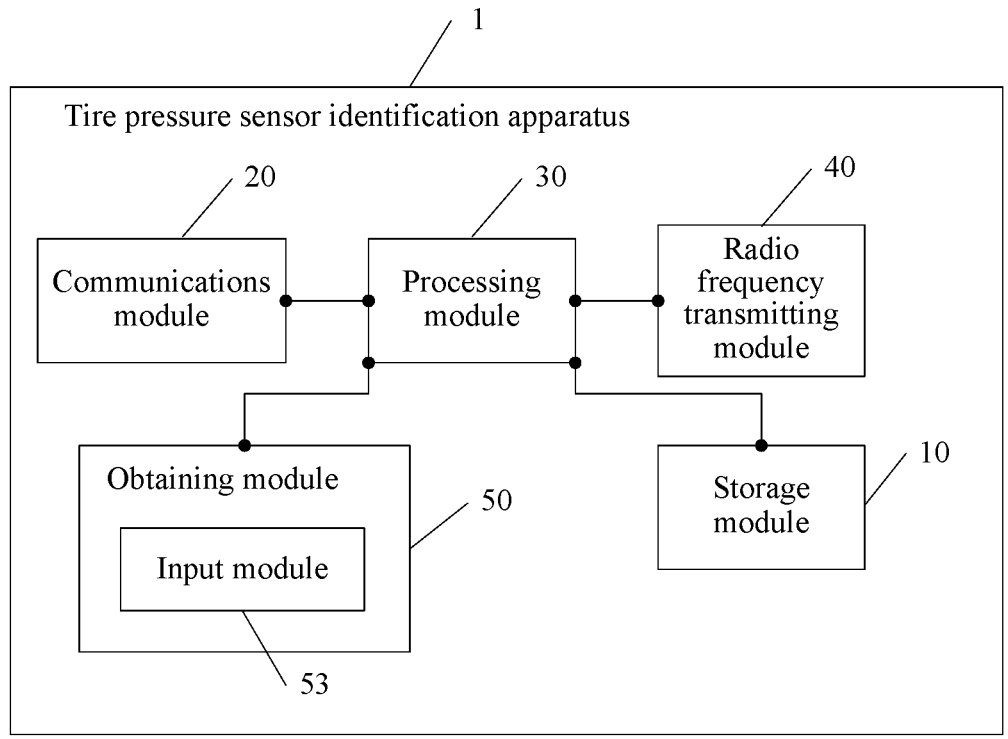
FIG. 3 is a schematic diagram of a functional framework of a second embodiment of a tire pressure sensor identification apparatus according to the present invention.

As shown in FIG. 3, in a second embodiment, the obtaining module 50 may include an input module 53, configured to receive identity information of the tire pressure sensor 2 input by a user.

The input module 53 is communicably connected to the processing module 30. The input module 53 receives an identification code (the identity information) of the tire pressure sensor 2 initiatively input by the user. The corresponding relationship between identification code and communication frequencies of different types of tire pressure sensors may be stored in the storage module 10. By pre-storing the corresponding relationship, the tire pressure sensor identification apparatus 1 can search out a communication frequency corresponding to the identification code input by the user without activating the tire pressure sensor 2, and send the identity information to an ECU 3 by the corresponding communication frequency. Therefore, when the ECU 3 enables the learning mode while inconvenient to activate the tire pressure sensor 2, it is also possible for the radio frequency transmission module 40 to simulate a corresponding radio frequency signal, so that the identity information of the tire pressure sensor 2 can be transferred to the ECU 3 in real time.

In implementations, the input module 53 is a common text input device or a code input device (the code includes, but is not limited to, a barcode, a two-dimensional barcode or the like). It is convenient for the user to initiatively input the identification code of the tire pressure sensor 2, for example, a barcode, a two-dimensional barcode or a corresponding numeral and/or a character code that facilities initiative input. The input module 53 may alternatively be a keyboard, a handwriting screen, or a combination of the keyboard and the handwriting screen, or may be an input apparatus easily receiving identification information input by an intermediate device or an auxiliary device, for example, a camera, a barcode/two-dimensional barcode scanning apparatus, or a point-to-point information transferring apparatus.

In an embodiment, the first embodiment and the second embodiment may be implemented in combination, so that the tire pressure sensor identification apparatus 1 may obtain identity information either from an activated tire pressure sensor 2 or from a user input.

In an embodiment, the tire pressure sensor identification apparatus 1 further includes a display module (not shown), communicably connected to the processing module 30 and configured to display the obtained identity information of the tire pressure sensor and/or a working status of the tire pressure sensor. The working status may include, but not limited to, at least one of a pressure value and a temperature value detected by the tire pressure sensor 2, a remaining electricity quantity and the like of the tire pressure sensor 2. The display module can make the user directly understand an operation status currently and directly observe the obtained identity information. Therefore, use of the tire pressure sensor 2 may be more convenient and humanized. In addition, the user views related information of the tire pressure sensor 2 by using the display module and can correspondingly modify information of the tire pressure sensor 2. For example, the user modifies the identification code of the tire pressure sensor 2 and stores the modified information after the information confirmation.

Figure 4:
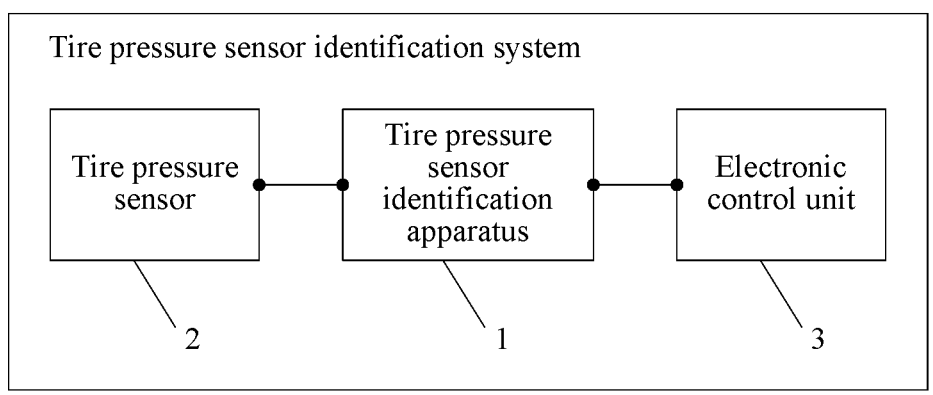
FIG. 4 is a schematic diagram of a framework of a tire pressure sensor identification system according to the present invention.

Referring to FIG. 4, an embodiment of the present disclosure further provides a tire pressure sensor identification system. As shown in FIG. 4, the tire pressure sensor identification system may include a tire pressure sensor 2, an ECU 3 and the tire pressure sensor identification apparatus 1 described in the foregoing embodiments, the tire pressure sensor identification apparatus 1 may be communicably connected to the ECU 3 or the tire pressure sensor 2. The tire pressure sensor 2 may be disposed in a tire of a vehicle, and the ECU 3 may be disposed in a cabin of the vehicle. The tire pressure sensor identification apparatus 1 may be a portable device, it may be disposed at any location near or on the vehicle, it communicates the ECU 3 or the tire pressure sensor 2 wirelessly; or the tire pressure sensor identification apparatus 1 may be an apparatus on the vehicle, it is fixedly connected to the vehicle or is detachably connected to the vehicle.

In implementation, the communications module 20 of the tire pressure sensor identification apparatus 1 is communicably connected to the ECU 3. The activation module 51 and the radio frequency receiving module 52 in the tire pressure sensor identification apparatus 1 are respectively communicably connected to the tire pressure sensor 2. The tire pressure sensor identification apparatus 1 uniformly collects and stores identity information of the tire pressure sensor 2 in each tire of the vehicle. When the ECU 3 needs to identify the tire pressure sensor 2, i.e. the ECU 3 turns into the sensor learning mode, such as in a situation that a TPMS is enabled for a first time or a tire pressure sensor 2 is replaced for a dead battery or other reasons, the tire pressure sensor identification apparatus 1 may simulate a corresponding tire pressure sensor 2 to send a radio frequency signal to the ECU 3. It avoids a limit that the tire pressure sensor 2 needs to be activated during identification, also avoids a limit that a user needs to repeatedly move to active tire pressure sensors 2 and ECU 3. In this way, an identification operation of an identification system for identifying the tire pressure sensor 2 is quick and efficient, and a user operation is also facilitated. For composition modules and a specific function of the tire pressure sensor identification apparatus 1, refer to partial of or all content described in the foregoing embodiments, which is not further described herein again.

Figure 5:
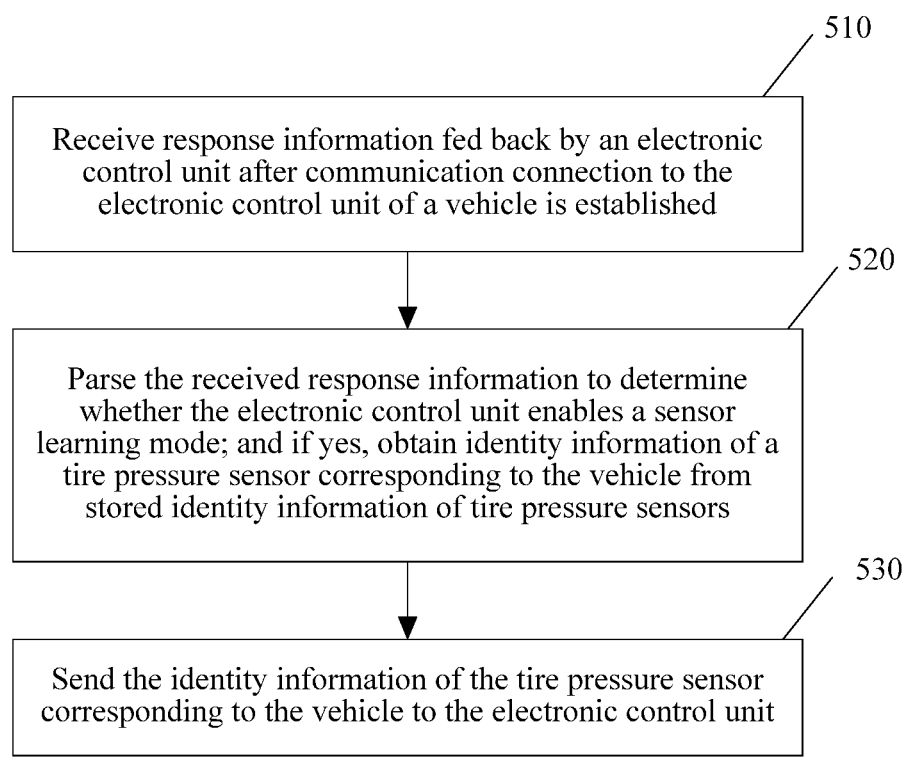
FIG. 5 is a schematic diagram of a basic procedure of a tire pressure sensor identification method according to the present invention.

Referring to FIG. 5, an embodiment of the present invention further provides a tire pressure sensor identification method. The tire pressure sensor identification method is applied to the tire pressure sensor identification apparatus 1 in the foregoing embodiments. As shown in FIG. 5, the method includes the following steps.

510: Receiving response information fed back by an ECU 3 after communication connection to the ECU 3 of a vehicle is established.

520: Parsing the received response information to determine whether the ECU 3 enables a sensor learning mode, and if yes, obtaining identity information of a tire pressure sensor 2 corresponding to the vehicle from stored identity information of tire pressure sensors.

530: Sending the identity information of the tire pressure sensor 2 corresponding to the vehicle to the ECU 3.

In an embodiment, the tire pressure sensor identification apparatus 1 may be communicably connected to the ECU 3 of the vehicle in a wireless or wired manner. After the connection, the tire pressure sensor identification apparatus 1 initiates a sensor learning request to the vehicle and receives the response information fed back by the ECU 3 of the vehicle. The response information is used for indicating whether the vehicle has successfully enabled the sensor learning mode and may also include related information, such as a model, a manufacturer and a license plate number, of the vehicle. Substantially, the tire pressure sensor identification apparatus 1 parses the response information to determine whether the vehicle enables the sensor learning mode, and if yes, the identity information of the tire pressure sensor 2 corresponding to the vehicle may be obtained from the identity information of the tire pressure sensors pre-stored in the tire pressure sensor identification apparatus 1. The identity information is sent to the ECU 3 of the vehicle, so that the ECU 3 of the vehicle completes the identification operation, i.e. the ECU identifies the tire pressure sensors 2 of the vehicle through the sent identity information, so that the ECU may recognize by which tire pressure sensor received information sent.

In an embodiment, the identity information of the tire pressure sensor 2 includes an identification code of the tire pressure sensor 2, which is used for uniquely identifying the tire pressure sensor 2. Different tire pressure sensors 2 have different identity information. It can be understood that, the pre-stored identity information of the tire pressure sensor 2 may be written into a storage module 10 by a developer during development of the tire pressure sensor identification apparatus 1, or may be obtained by the tire pressure sensor identification apparatus 1 externally and stored in the storage module 10. This is not limited in this embodiment of the present invention.

In another embodiment, the identity information further includes, but is not limited to, at least one of specific data such as a model, a manufacturer, a service date and battery capacity information.

In an embodiment, the tire pressure sensor identification apparatus 1 may establish a relatively stable connection to the ECU 3 disposed inside the vehicle, so that the ECU 3 does not need to perform an activation operation on the tire pressure sensors 2 one by one when identifying the tire pressure sensors 2, thereby simplifying an identification procedure.

In addition, the tire pressure sensor identification apparatus 1 is effectively prevented from unilaterally sending information for a long time and causing waste of electric energy, so as to prolong a standby time of the tire pressure sensor identification apparatus 1, especially when the tire pressure sensor identification apparatus 1 adopts an implementation manner of a handheld device.

Figure 6:
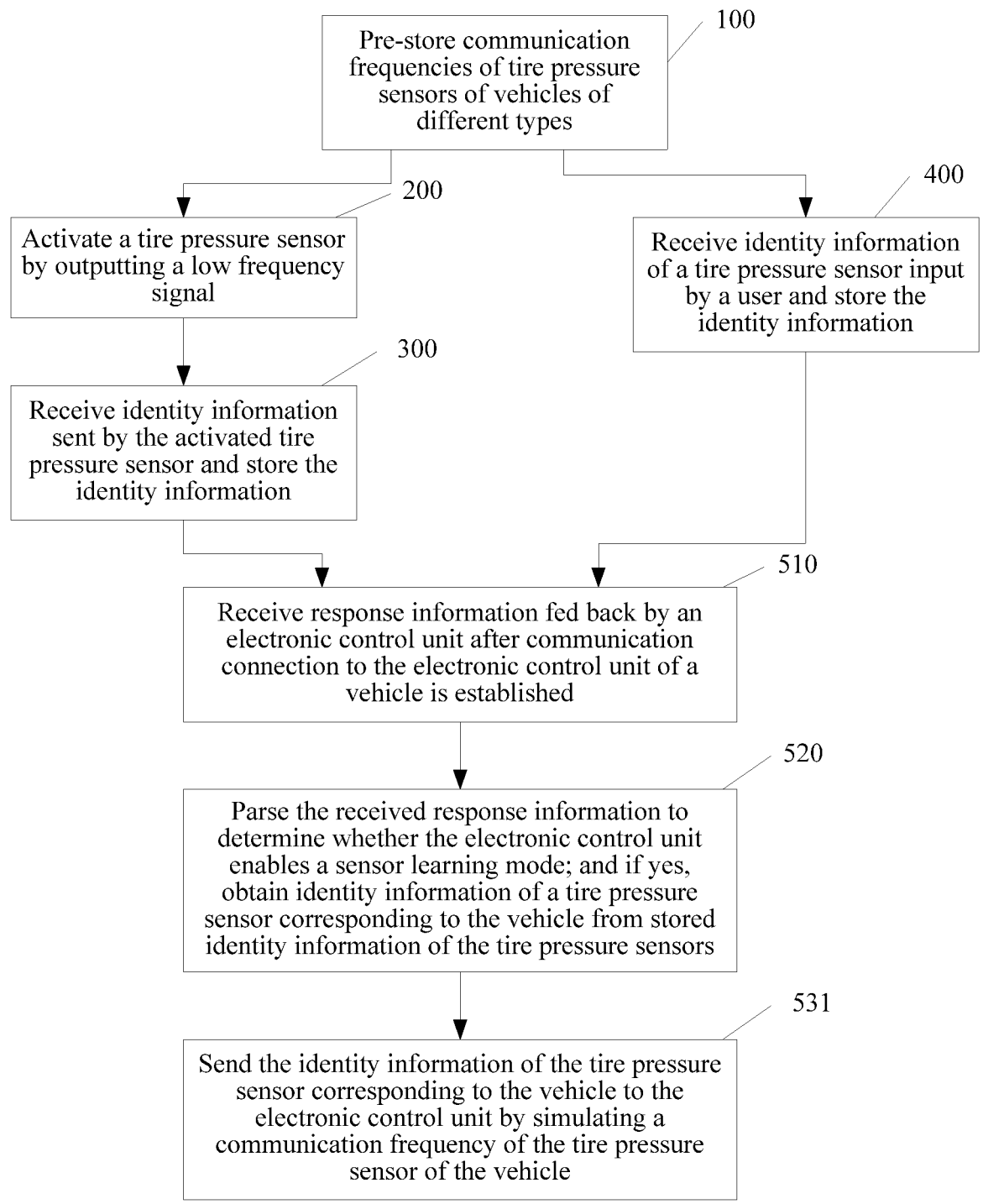
FIG. 6 is a schematic diagram of a complete procedure of a tire pressure sensor identification method according to the present invention.

In an embodiment, as shown in FIG. 6, before performing step 510 of receiving response information fed back by an ECU 3 after communication connection to the ECU 3 of a vehicle is established, the tire pressure sensor identification method may further include the following steps:

200: Activating a tire pressure sensor 2 by outputting a low frequency signal.

300: Receiving identity information sent by the activated tire pressure sensor 2 and storing the identity information.

The foregoing solution is a solution in which the identity information of the tire pressure sensor 2 is obtained in an activation manner. In an activation process, a radio frequency signal sent by the tire pressure sensor 2 is received and the identity information included in the radio frequency signal are obtained.

In an embodiment, as shown in FIG. 6, before performing step 510 of receiving response information fed back by an ECU 3 after communication connection to the ECU 3 of a vehicle is established, the tire pressure sensor identification method may further include the following step:

400: Receiving identity information of a tire pressure sensor 2 input by a user and store the identity information.

In this solution, a manner of receiving the identity information input by the user is used to identify the tire pressure sensor 2 uniquely corresponding to the identity information. In addition, communication frequencies of tire pressure sensors 2 of vehicles of different types are preset to serve as support; in another way, the communication frequencies may also input by the user. The input identity information can match the preset communication frequencies, so that the ECU 3 may implement communication with the tire pressure sensor 2 by using the matched communication frequency and identity information. Specifically, when the ECU 3 enters a learning mode, the tire pressure sensor identification apparatus 1 sends the identity information to the ECU 3 by using the matched communication frequency.

In an embodiment, before performing step 510 of receiving response information fed back by an ECU 3 after communication connection to the ECU 3 of a vehicle is established, the tire pressure sensor identification method may further include the following step:

100: Pre-storing communication frequencies of tire pressure sensors 2 of vehicles of different types.

Step 530 of sending the identity information of the tire pressure sensor 2 corresponding to the vehicle to the ECU 3 may specifically include the following step:

531: Sending the identity information of the tire pressure sensor 2 corresponding to the vehicle to the ECU 3 by simulating a communication frequency of the tire pressure sensor of the vehicle.

Specifically, the tire pressure sensor identification apparatus 1 may obtain, based on a model of the vehicle included in the response information, a communication frequency of a tire pressure sensor 2 corresponding to the model of the vehicle from pre-stored communication frequencies. The tire pressure sensor identification apparatus 1 simulates the communication frequency of the tire pressure sensor 2, so that the ECU 3 can also receive a same radio frequency signal as the tire pressure sensor 2 before or after the tire pressure sensor 2 is activated. This step enables an identification process of the ECU 3 without simultaneously activating the tire pressure sensor 2, thereby facilitating operation performed by a user on the ECU 3, avoiding reciprocation of the user between a tire and a cab and improving identification efficiency of a tire pressure sensor identification system.

In conclusion, the tire pressure sensor identification apparatus 1 in the present disclosure may store the identity information of the tire pressure sensor 2 in the storage module 10. In addition, the radio frequency transmission module 40 simulates the tire pressure sensor 2 sending the corresponding identity information. This avoids a limit that the sensor needs to be in an activated state when the ECU 3 identifies the tire pressure sensor 2. By using the tire pressure sensor identification apparatus 1 in the present disclosure, the ECU 3 may identify the tire pressure sensor 2 at any time. The ECU 3 does not need to be constrained to perform identification in a time period when the tire pressure sensor 2 is activated. An identification operation of the ECU 3 is simplified and usage by the user is facilitated. The tire pressure sensor identification system and the tire pressure sensor identification method adopting the tire pressure sensor identification apparatus 1 in present disclosure also have the foregoing advantages.

Figure 7:
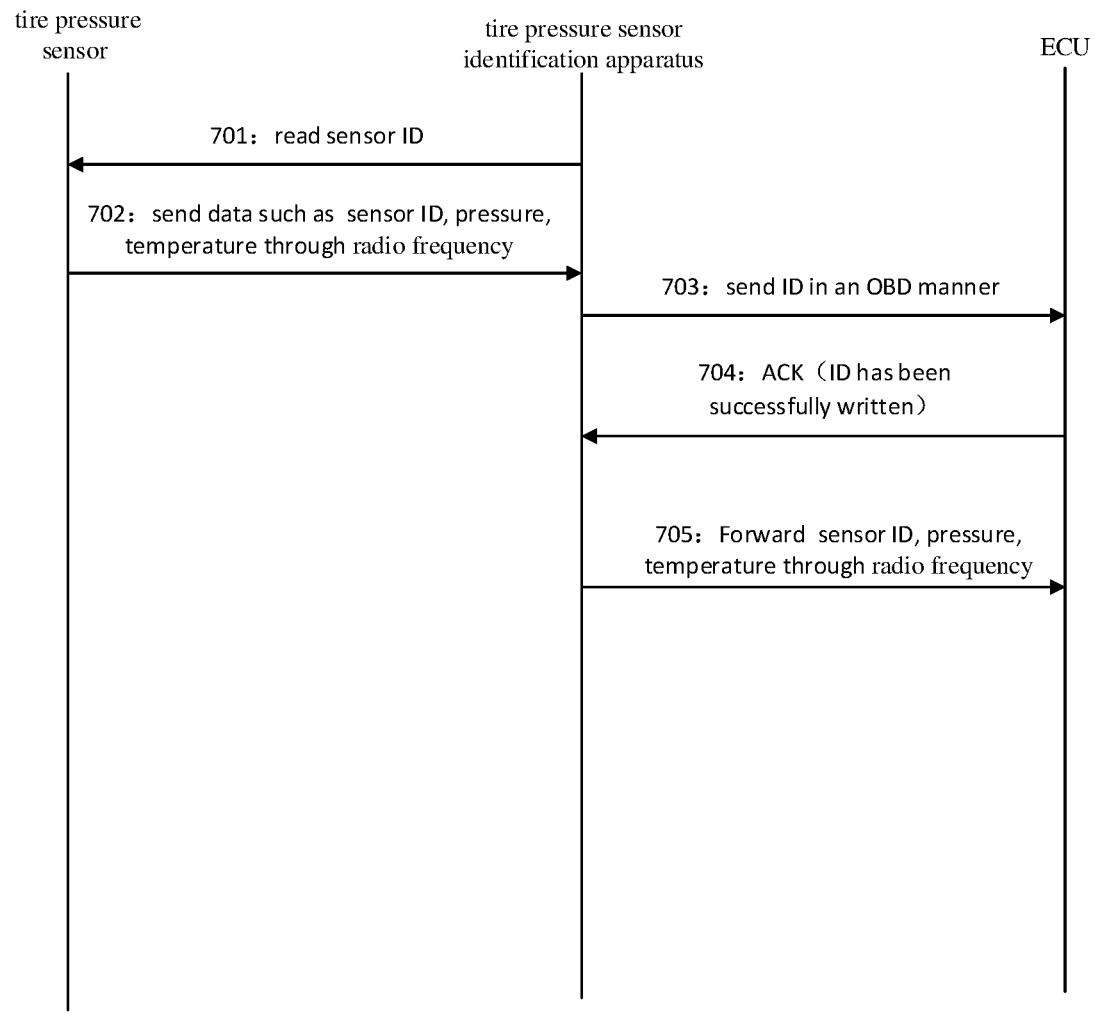
FIG. 7 is a schematic diagram of another complete procedure of a tire pressure sensor identification method according to the present invention.

According to FIG. 7, an embodiment of the present invention relates to a manner to write an identification of a tire pressure sensor through OBD (on-Board Diagnostics) bus. Through this manner, the ECU can identify the identification of every tire pressure sensor. Data such as pressure and temperature are sent to the ECU through a tire pressure sensor identification apparatus.

Detailed steps are described below:

Step 701: The tire pressure sensor identification apparatus sends a command of reading identification information of a tire pressure sensor. (e.g. ID of the tire pressure sensor)

Step 702: The tire pressure sensor sends data such as an ID of the tire pressure sensor, tire pressure and tire temperature.

Step 703: The tire pressure sensor identification apparatus communicates with the ECU of the vehicle through an OBD bus manner.

Step 704: The ECU replies through Acknowledge Character (ACK) that an ID of the tire pressure sensor has been written.

Step 705: The tire pressure sensor identification apparatus sends data such as the ID of the tire pressure sensor, a tire pressure and a tire temperature that are received from the tire pressure sensor before to the ECU.

The tire pressure sensor identification apparatus may simulate a radio signal sent by a corresponding tire pressure sensor. In this way, it is convenient for the ECU to uniformly identify each tire pressure sensor on the vehicle, thereby preventing a user from reciprocating many times and from performing complex operations of inflating or deflating tires, simplifying an operation procedure in which the ECU identifies the tire pressure sensor. and improving identification operation efficiency and user experience.

Figure 8:
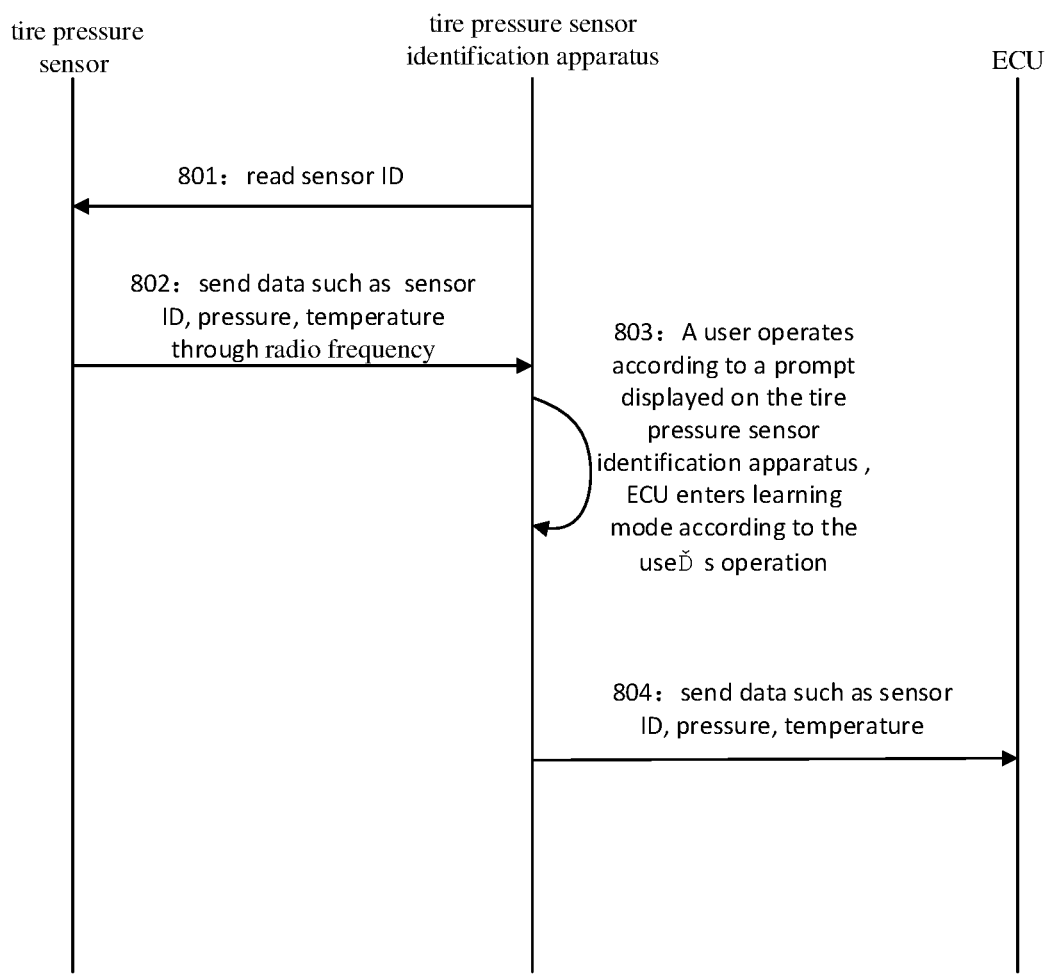
FIG. 8 is a schematic diagram of the other complete procedure of a tire pressure sensor identification method according to the present invention.

According to FIG. 8, the embodiment of the present invention discloses identification of each identifier of every tire pressure sensor for the ECU through static learning manner. Also, the data such as pressure and temperature of the tire pressure sensor are sent to the ECU through tire pressure sensor identification apparatus.

Detailed steps are described below:

Step 801: The tire pressure sensor identification apparatus sends a command of reading identification information of a tire pressure sensor. (e.g. ID of the tire pressure sensor)

Step 802: The tire pressure sensor sends data such as an ID of the tire pressure sensor, tire pressure and tire temperature.

Step 803: The ECU enters a learning mode through a static learning process by the tire pressure sensor identification apparatus and the ECU. For example, the tire pressure sensor identification apparatus prompts the user to press various buttons in a certain sequence to enable the ECU to enter the learning mode.

Step 804: The tire pressure sensor identification apparatus sends data such as the ID of the tire pressure sensor, a tire pressure and a tire temperature that are received from the tire pressure sensor before to the ECU.

The tire pressure sensor identification apparatus may simulate a radio signal sent by a corresponding tire pressure sensor. In this way, it is convenient for the ECU to uniformly identify each tire pressure sensor on the vehicle, thereby preventing a user from reciprocating many times and from performing complex operations of inflating or deflating tires, simplifying an operation procedure in which the ECU identifies the tire pressure sensor. and improving identification operation efficiency and user experience.

The descriptions above are only specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A tire pressure sensor identification apparatus, comprising a storage module, a communications module, a processing module and a radio frequency transmission module, wherein the storage module, the communications module and the radio frequency transmission module are respectively communicably connected to the processing module;

the storage module is configured to store identity information of a tire pressure sensor;

the communications module is configured to communicate with an electronic control unit (ECU) of a vehicle and to receive response information fed back by the ECU; and the processing module is configured to determine the ECU enables a sensor learning mode by parsing the response information received by the communications module, and to control the radio frequency transmission module to send identity information of the tire pressure sensor corresponding to the vehicle.

2. The tire pressure sensor identification apparatus according to claim 1, wherein
the storage module is further configured to store communication frequencies of tire pressure sensors of different types of vehicles; and
the radio frequency transmission module is configured to send the identity information of the tire pressure sensor to the vehicle by simulating a communication frequency of the tire pressure sensor of the vehicle.

3. The tire pressure sensor identification apparatus according to claim 2, further comprising an obtaining module, communicably connected to the processing module and configured to obtain identity information of the tire pressure sensor, the identity information being stored in the storage module after being processed by the processing module.

4. The tire pressure sensor identification apparatus according to claim 2, further comprising a display module, communicably connected to the processing module and configured to display the obtained identity information and/or a working status of the tire pressure sensor.

5. The tire pressure sensor identification apparatus according to claim 1, further comprising an obtaining module, communicably connected to the processing module and configured to obtain identity information of a tire pressure sensor, the identity information being stored in the storage module after being processed by the processing module.

6. The tire pressure sensor identification apparatus according to claim 5, wherein the obtaining module comprises an activation module and a radio frequency receiving module, the activation module being configured to activate the tire pressure sensor by outputting a low frequency signal, and the radio frequency receiving module being configured to receive identity information sent by the activated tire pressure sensor.

7. The tire pressure sensor identification apparatus according to claim 6, further comprising a display module, communicably connected to the processing module and configured to display the obtained identity information and/or a working status of the tire pressure sensor.

8. The tire pressure sensor identification apparatus according to claim 5, wherein the obtaining module comprises an input module, configured to receive the identity information of the tire pressure sensor input by a user.

9. The tire pressure sensor identification apparatus according to claim 8, further comprising a display module, communicably connected to the processing module and configured to display the obtained identity information and/or a working status of the tire pressure sensor.

10. The tire pressure sensor identification apparatus according to claim 5, further comprising a display module, communicably connected to the processing module and configured to display the obtained identity information and/or a working status of the tire pressure sensor.

11. The tire pressure sensor identification apparatus according to claim 1, further comprising a display module, communicably connected to the processing module and configured to display the obtained identity information and/or a working status of the tire pressure sensor.

12. A tire pressure sensor identification method, comprising the following steps:
receiving response information fed back by an electronic control unit (ECU) after establishing a communication connection to the ECU of a vehicle;
determining the ECU enables a sensor learning mode by parsing the received response information, and obtaining identity information of a tire pressure sensor installed in the vehicle from stored identity information of tire pressure sensors; and
sending the identity information of the tire pressure sensor corresponding to the vehicle to the ECU.

13. The tire pressure sensor identification method according to claim 12, wherein before the step of receiving response information fed back by the electronic control unit (ECU) after communication connection to the ECU of a vehicle is established, the method further comprises the following steps:
activating the tire pressure sensor by outputting a low frequency signal; and
receiving identity information sent by the activated tire pressure sensor and storing the identity information.

14. The tire pressure sensor identification method according to claim 13, further comprising the following step:
pre-storing communication frequencies of tire pressure sensors of different types of vehicles, wherein
the step of sending the identity information of the tire pressure sensor corresponding to the vehicle to the ECU comprises:
sending the identity information of the tire pressure sensor corresponding to the vehicle to the ECU by simulating a communication frequency of the tire pressure sensor of the vehicle.

15. The tire pressure sensor identification method according to claim 12, wherein before the step of receiving response information fed back by an electronic control unit (ECU) after communication connection to the ECU of a vehicle is established, the method further comprises the following step:
receiving identity information of a tire pressure sensor input by a user and storing the identity information.

16. The tire pressure sensor identification method according to claim 15, further comprising the following step:
pre-storing communication frequencies of tire pressure sensors of different types of vehicles, wherein
the step of sending the identity information of the tire pressure sensor corresponding to the vehicle to the ECU comprises:
sending the identity information of the tire pressure sensor corresponding to the vehicle to the ECU by simulating a communication frequency of the tire pressure sensor of the vehicle.

17. The tire pressure sensor identification method according to claim 12, further comprising the following step:
pre-storing communication frequencies of tire pressure sensors of different types of vehicles, wherein
the step of sending the identity information of the tire pressure sensor corresponding to the vehicle to the ECU comprises:
sending the identity information of the tire pressure sensor corresponding to the vehicle to the ECU by simulating a communication frequency of the tire pressure sensor of the vehicle.

18. A tire pressure sensor identification method, comprising the following steps:
sending identification information received from a tire pressure sensor corresponding to a vehicle through on-board diagnostics bus after establishing a communication connection to an electronic control unit (ECU) of the vehicle;
receiving a response information sent by the ECU after the ECU receives the identification information;

sending the identification information, pressure and temperature measured by the tire pressure sensor to the ECU through radio frequency according to the response information.

19. A tire pressure sensor identification apparatus, comprising a storage module, a communications module, a processing module, and a radio frequency transmission module, wherein the storage module, the communications module and the radio frequency transmission module are respectively communicably connected to the processing module;

the storage module is configured to store identification information, pressure and temperature of a tire measured by a tire pressure sensor;

the communication module is configured to send identification information to an ECU of a vehicle, and to receive a response information indicating the identification information has been written into the ECU fed back by the ECU;

the processing module is configured to control the communication module to send the identification information of the tire pressure sensor to the ECU, and to control the radio frequency transmission module to send the identification information, pressure and temperature measured by the tire pressure sensor to the ECU;

the radio frequency transmission module is configured to send the identification information, pressure and temperature measured by the tire pressure sensor to the ECU after receiving the response information indicating the identification information has been written into the ECU fed back by the ECU.

20. A tire pressure sensor identification method, comprising the following steps:

displaying an operation needed by a user on a display screen for the user's reference during operation by the user after establishing a communication connection to an electronic control unit (ECU) of the vehicle;

enabling the ECU to enter a learning mode according to a user's operation after the user executes the operation according to the displayed operation;

sending the acquired the identification information, pressure and temperature measured by a tire pressure sensor to the ECU after the ECU enters the learning mode.

21. A tire pressure sensor identification apparatus, comprising a storage module, an interfacing module, a processing module, and a radio frequency transmission module, wherein the storage module, the interfacing module and the radio frequency transmission module are respectively communicably connected to the processing module;

the storage module is configured to store identification information, pressure and temperature of a tire measured by a tire pressure sensor;

the interfacing module is configured to interface with a user, display an operation needed by the user for the user's reference during operation;

the processing module is configured to enable an electronic control unit (ECU) to enter a learning mode according to the user's operation after the user executes the operation according to the displayed operation;

the radio frequency transmission module is configured to acquire the identification information of the tire pressure sensor corresponding to a vehicle, and the pressure and the temperature of the tire, and to send the acquired the identification information, pressure and temperature to the ECU after the ECU enters the learning mode.

* * * * *